(12) United States Patent
Bilcai et al.

(10) Patent No.: US 8,778,129 B2
(45) Date of Patent: Jul. 15, 2014

(54) METHOD FOR ATTACHING A MAGNET ON OR IN A ROTOR OR STATOR

(75) Inventors: Eugen Bilcai, Oberschleissheim (DE); Emilie Barriau, Laguna Niguel, CA (US); Stefan Haslberger, Hallbergmoos (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/354,521

(22) Filed: Jan. 20, 2012

(65) Prior Publication Data

US 2012/0161565 A1 Jun. 28, 2012

Related U.S. Application Data

(63) Continuation of application No. PCT/EP2010/061278, filed on Aug. 3, 2010.

(30) Foreign Application Priority Data

Aug. 3, 2009 (DE) .......................... 10 2009 028 180

(51) Int. Cl.
| | | |
|---|---|---|
| B41J 2/16 | (2006.01) |
| C09J 163/00 | (2006.01) |
| C04B 37/00 | (2006.01) |
| B29C 65/00 | (2006.01) |
| B32B 37/00 | (2006.01) |
| B32B 38/04 | (2006.01) |
| H02K 21/26 | (2006.01) |

(52) U.S. Cl.
USPC ........ 156/326; 156/275.5; 156/325; 156/330; 310/154.07

(58) Field of Classification Search
USPC .................. 156/275.5, 325, 330; 310/154.07
See application file for complete search history.

(56) References Cited

U.S. PATENT DOCUMENTS

| | | | | |
|---|---|---|---|---|
| 4,935,080 A | * | 6/1990 | Hassell et al. ................ 156/154 |
| 5,084,532 A | | 1/1992 | Schenkel | |
| 5,201,111 A | | 4/1993 | Prohcska | |
| 6,277,481 B1 | * | 8/2001 | Sugino et al. .............. 428/317.1 |
| 7,241,502 B2 | | 7/2007 | Anselmann et al. | |
| 2008/0308212 A1 | * | 12/2008 | Sheasley et al. ................ 156/78 |

FOREIGN PATENT DOCUMENTS

| | | |
|---|---|---|
| DE | 1613312 | 9/1950 |
| DE | 8624280 | 7/1987 |
| DE | 3923974 | 1/1991 |
| DE | 10349442 | 5/2005 |
| DE | 102007033214 | 3/2008 |
| EP | 354498 | 10/1999 |
| EP | 1469020 | 10/2004 |
| JP | 1998126988 | 5/1998 |
| JP | 2007151362 | 6/2007 |
| JP | 2007174872 | 7/2007 |
| WO | 9300381 | 1/1993 |
| WO | 9712009 | 4/1997 |
| WO | 0037554 | 6/2000 |
| WO | 2004111136 | 12/2004 |
| WO | 2006053640 | 5/2006 |
| WO | 2007025007 | 3/2007 |

OTHER PUBLICATIONS

3M, Scotch-Weld 2214 MSDS, Nov. 21, 2007, pp. 1-8.*

* cited by examiner

*Primary Examiner* — Michael Orlando
(74) *Attorney, Agent, or Firm* — James E. Piotrowski

(57) ABSTRACT

The invention relates to a method for adhesively bonding a magnet onto the surface or into a slot of a rotor or stator of an electric motor or a generator, wherein i) the surface or surfaces to be glued of the magnet, rotor or stator are pre-coated with an adhesive that is not liquid at 22° C. and that does not cure without an activation step, iii) the magnet is brought into contact with the rotor or stator at the adhesive location, and iv) the adhesive is activated by heating or by high-energy radiation so that it cures, characterized in that the adhesive comprises a) at least one reactive epoxide prepolymer, b) at least one latent hardener for epoxies, and c) one or more elastomers. The adhesive preferably comprises a blowing agent. The invention further relates to a corresponding pre-coated magnet.

11 Claims, No Drawings

METHOD FOR ATTACHING A MAGNET ON OR IN A ROTOR OR STATOR

The present invention relates to a method for adhesively bonding magnets onto the surface of a rotor or stator of an electric motor or of a generator, resp. to the adhesive bonding of magnets into slots (called "oblong holes" or "pockets") in the rotor or stator. The magnets can be of planar configuration (i.e. they are in the shape of a plate having a height that is at most half as great as the shortest width. The magnets can, however, also be convex/half-round or even annular. One or more surfaces are pre-coated with a special adhesive that is not liquid at room temperature and that does not cure without an activation step. The magnets thus pre-coated with adhesive can be shipped and stored without causing the adhesive layer to lose its functionality. The adhesive hardens only after an activation step that is performed immediately before or after the magnets are set in place resp. inserted. Alternatively, provision can also be made for coating of the joining partners (for example, a shaft for annular magnets or even a stator housing).

In the manufacture of rotors or stators of electric motors or generators, it is usual for magnets in the shape of small plates to be adhesively bonded onto the surface of the rotor or stator, or bonded into slots ("oblong holes") in the rotor or stator. Liquid adhesives that are applied onto the magnets immediately before placement of the magnets onto the surface of the rotor or stator have hitherto been used for this. In the case of magnets that are inserted into oblong holes, the liquid adhesive is dispensed into the bonding gap after joining. This is a complex and laborious process step.

Application of a liquid adhesive in the production area for the rotors resp. stators has the disadvantage that special application systems must be made available for this. Malfunctions of the application systems can result in contamination of the working area and workpieces with adhesive. A principal problem is wetting the entire surface of the magnets with liquid adhesive, especially in the case of oblong holes.

The use of adhesives that are solid at room temperature has furthermore already been proposed in the existing art for this application purpose. These adhesives that are solid at room temperature have not yet proven entirely convincing, however, in terms of the durability of the adhesive bond achieved, its thermal stability, creep resistance, and bonding strength, and easy processability.

The present invention proposes a solution to these problems. By means of the method according to the present invention it is possible, for example, to avoid cohesion failures within the magnet even with large magnets and/or at high application temperatures (e.g. when used above 120° C. or even above 150° C.). The method according to the present invention furthermore allows wetting over a large area without air inclusions, and also provides a good level of creep resistance.

One subject of the present invention is a method for adhesively bonding a magnet onto the surface or into a slot of a rotor or stator of an electric motor or of a generator, in which i) the surface or surfaces of the magnet that is or are to be bonded are pre-coated with an adhesive that is not liquid at 22° C. and that does not cure without an activation step;

ii) optionally, the magnet coated with the adhesive is temporarily stored and/or is transported from the coating location to the bonding location, iii) the magnet having the surface coated with the adhesive is placed onto the surface of the rotor or stator and immobilized, or the magnet is inserted into a slot of the rotor or stator in such a way that at least one adhesive-coated surface is located opposite an inner wall of the slot, and iv) the adhesive is activated, by heating or by high-energy radiation, so that it cures,
wherein an adhesive containing
a) at least one reactive epoxy prepolymer,
b) at least one latent hardener for epoxies, and
c) one or more elastomers
is used.

As a result of the very effective, almost complete exploitation of the available bonding surface, joint geometries can be greatly simplified and production of the components as well as subsequent assembly can be made extremely economical. Joint geometries that transfer transverse and tensile forces by positive undercutting (the dovetail connection is very well known) can be redesigned as a plain intermaterial parallel butt joint. Combinations with frictionally engaging connecting elements (screws) can also be omitted. Surface roughness or production tolerances are also better compensated for by the expansion of an adhesive containing a foaming agent.

Alternatively, provision can also be made for coating of the joining partners (e.g. a shaft for annular magnets, or even a stator housing). An alternative embodiment of the present invention is therefore embodied in a method for adhesively bonding a magnet onto the surface or into a slot of a rotor or stator of an electric motor or of a generator, in which i) the surface or surfaces of the rotor or stator that is or are to be bonded are pre-coated with an adhesive that is not liquid at 22° C. and that does not cure without an activation step;

ii) optionally, the rotor or stator coated with the adhesive is temporarily stored and/or is transported from the coating location to the bonding location, iii) the magnet is brought into contact with the adhesive-coated surface of the rotor or stator, and iv) the adhesive is activated, by heating or by high-energy radiation, so that it cures,
wherein an adhesive containing
a) at least one reactive epoxy prepolymer,
b) at least one latent hardener for epoxies, and
c) one or more elastomers
is used.

By using the special adhesives it is now possible to achieve adhesive bonds that remain stable over a wide temperature range and also allow bonding of large magnets. Thanks to these advantages that are achieved, it is also possible to use the magnets bonded in accordance with the method according to the present invention, for example, in wind energy facilities, which optionally can in fact be operated in stable fashion in offshore wind parks.

"Magnets" are understood in the context of this invention as permanent magnets, magnetized or magnetizable materials. In accordance with the method according to the present invention, the magnets can be bonded onto resp. into the inner surfaces of the stator housing, onto the outer surface of the rotor, or into oblong holes in the rotor or stator. Instead of the term "oblong hole," the shorter term "slot" will be used hereinafter.

What is meant by the statement that the adhesive is "not liquid" in the range of room temperature, i.e. at 22° C., is that it does not run off the coated surface under the influence of gravity. It is at least sufficiently solid that it is not deformed under the weight of the magnet when the latter is placed, with the surface coated with adhesive, onto a substrate.

Thanks to the method according to the present invention, coating of the magnets with the adhesive can be separated in space and time from the bonding of the magnets onto resp.

into the surface of the rotor or stator resp. the insertion of the magnets into the rotor or stator. Coating of the magnets with the adhesive can thus be displaced into a correspondingly equipped special department, or to the magnet manufacturer. The adhesive can be extruded or overmolded onto the magnets. In a preferred embodiment, the adhesive can moreover be laminated onto the magnets as an adhesive film. The coated magnets can then be temporarily stored and/or transported from the coating location to the bonding location. No adhesive application takes place in the assembly operation, where the magnets are installed. Handling of liquid adhesives at the location where the rotors resp. stators are produced is eliminated. Wetting problems or contamination as a result of improperly applied adhesive are therefore avoided. The same is analogously true for pre-coating of a rotor or stator with the adhesive.

"Activation" of the adhesive is understood as an operation that initiates curing of the adhesive by way of a mutual chemical reaction among adhesive components. This can be an irradiation with high-energy radiation (e.g. electron irradiation, electromagnetic induction, ultrasound, laser or UV radiation, visible light), or the adhesive is heated to a temperature at which a chemical crosslinking reaction of adhesive components occurs.

The magnet resp. the rotor or stator is by preference coated with the adhesive in such a way that the layer thickness of the adhesive before curing is in the range from approximately 0.1 to approximately 5 mm.

The following sequences are possible for steps iii) and iv):

1. The magnets are joined at room temperature, curing of the adhesive occurs in an oven, under irradiation with infrared radiation, or by heating using electromagnetic induction.

2. When the magnets are installed into oblong holes, the substrates can be heated up very quickly by electromagnetic induction, prior to joining. The magnets can be inserted into the preheated substrate and are then finally cured by further heating, for example in an oven.

3. Magnets having a self-adhering adhesive coating are joined, an apparatus for adjusting the gap dimension is inserted immediately before thermal curing, and curing then occurs by heating.

An embodiment of the method according to the present invention is characterized in that the magnet is adhesively bonded onto the surface of the rotor or stator; and an adhesive that is tacky at a temperature in the range from 15 to 50° C. is used for pre-coating the magnet.

"Tacky" refers according to the present invention to adhesives whose nature is such that the magnet, placed onto the surface of the rotor or stator before curing of the adhesive, does not slip or fall off under the influence of gravity or of forces as a consequence of assembly-related handling.

Separate securing of the magnet before curing of the adhesive can thereby be omitted. One skilled in the art is familiar with ways of making adhesives tacky. This can be done, for example, by the fact that the adhesive contains components that are liquid in the aforesaid temperature range, or that it contains so-called "tackifiers," e.g. tack resins or waxes. Examples thereof are indicated below in connection with possible compositions of the adhesives.

If the adhesive is tacky in the range of room temperature, i.e. between approximately 15 and approximately 25° C., the magnet can be secured onto the rotor resp. stator by placing the adhesive-coated side onto the surface thereof. In the alternative embodiment, the uncoated magnet is placed onto the pre-coated location on the rotor or stator. If the adhesive is tacky only in the temperature range above room temperature, i.e. for example in the temperature range between 20 and 50° C., it is recommended that at least that part of the surface of the rotor or stator onto which the magnet is to be placed be preheated to the corresponding temperature.

A further embodiment of the method according to the present invention is characterized in that the magnet is adhesively bonded into a slot of the rotor or stator; and an adhesive that is not tacky at a temperature in the range from 15 to 50° C. is used for pre-coating. A non-tacky adhesive is therefore preferably used in this embodiment so that the magnet can more easily be inserted into the slots of the rotor or stator, and insertion is not impeded by premature adhesion of the magnet to the slot wall.

In both embodiments it may be advantageous for the adhesive to expand irreversibly before resp. during curing. This is advantageous in particular in the embodiment in which the desire is to adhesively bond the magnets, pre-coated with adhesive, into slots in the rotor or stator. As a result of the irreversible expansion of the adhesive, the slot between the slot wall and magnet fills up completely with the adhesive. It is therefore particularly advantageous for the latter embodiment to use an adhesive that irreversibly increases in volume after the activation step, i.e. before or upon curing, by at least 1% (determined at 22° C. and based on the volume at 22° C. before expansion and curing).

The upper limit of the irreversible expansion can be 50%, 100%, or 200%, based in each case on the volume at 22° C. For example, the upper limit of the expansion factor can be 90%. As is known, the expansion factor can be adjusted by way of the nature and quantity of blowing agent.

In an embodiment, an adhesive that can be activated by irradiation with high-energy radiation (as discussed above) is used. In this case it is preferable for the adhesive to be activated by irradiation with high-energy radiation before the adhesive-coated magnet is applied onto the surface of the rotor or stator, or is inserted into a slot of the rotor or stator.

Less technical complexity is required, however, if an adhesive that can be activated by heating to a temperature in the range from 60 to 200° C. is used, and if the adhesive is heated, after step iii), to a temperature in the aforesaid range so that it cures and, if applicable, expands before or upon curing. Heating can be accomplished, for example, by introducing the entire rotor or stator into a corresponding heating oven. Alternatively, the rotor or stator can be locally heated in the region of the magnets to be put in place resp. inserted, for example by irradiation with infrared radiation, by application of blown-on hot air, or by electromagnetic induction. The duration of heating can be, for example, between 1 and 120 minutes, by preference between approximately 5 and approximately 45 minutes. The temperature selected is by preference in the range between 100 and 180° C., in particular between 100 and 180° C.

If the adhesive contains a blowing agent, it is expanded simultaneously with curing. Because of the increase in volume after activation, it is not necessary for the magnet pre-coated with adhesive to be inserted in accurately fitting fashion into the slot. An air gap can instead remain between the adhesive and the slot wall, thus facilitating insertion of the magnet into the slot. As a result of the increase in volume, the adhesive fills up this air gap after activation and thereby connects the two joined parts intermaterially. As a result of the expansion, not only can production tolerances be better compensated for, but an exact air gap adjustment (and thus an increase in efficiency) can also take place.

In this case the adhesive contains a physically or chemically acting blowing agent that is itself activated upon activation of the adhesive and, by gas evolution or gas expansion, increases the volume of the adhesive (irreversibly after curing).

In physically acting blowing agents, the increase in volume is a physical consequence of the heating of hollow microspheres filled with gas or with evaporable liquid. Preferred physical blowing agents are, for example, expanding hollow microspheres. Expandable hollow plastic microspheres based on polyvinylidene chloride copolymers or acrylonitrile-(meth)acrylate copolymers are used with particular preference. These are commercially obtainable, for example, under the names "Dualite" resp. "Expancel" from the Pierce & Stevens resp. Akzo Nobel companies.

The use of physical blowing agents, in particular of expandable hollow spheres, is particularly preferred according to the present invention. This embodiment makes it possible to avoid any porosity in the adhesive bond and thus to enable gas-tight bonds. An adhesive bond is "gas-tight" for purposes of the present invention when, in a test using 100% helium and a test pressure difference of 7 bar, a helium leak rate of $2.5 \times 10^{-6}$ mbar·l·s$^{-1}$ is not exceeded.

In chemical blowing agents, a chemical reaction causes release of a gas that produces the increase in the volume of the adhesive. Examples of the chemical blowing agents are azobisisobutyronitrile, azodicarbonamide, dinitrosopentamethylenetetramine, 4,4'-oxybis(benzenesulfonic acid hydrazide), diphenylsulfone-3,3'-disulfohydrazide, benzene-1,3-disulfohydrazide, p-toluenesulfonyl semicarbazide.

Examples of adhesives that can be used in the context of the present invention are so-called "reactive melt adhesives." These are spreadable in the melted state, so that in that state they can be applied onto the magnet without activation of the curing mechanism. The latter instead requires heating to a higher activation temperature, at which a latent hardener for a reactive binding agent component (for example, a prepolymer having epoxy groups or isocyanate groups) becomes activated.

A reactive melt adhesive that is suitable is, for example, described in EP 354 498 A2. This contains a resin component, at least one thermally activatable latent hardener for the resin component, and optionally accelerators, fillers, thixotropy adjuvants, and further usual additives, the resin component being obtainable by reacting an epoxy resin that is solid at room temperature, an epoxy resin that is liquid at room temperature, and a linear polyoxypropylene having amino terminal groups. The epoxy resins are used in a quantity, based on the polyoxypropylene having amino terminal groups, such as to ensure an excess of epoxy groups, based on the amino groups. Dicyandiamide, for example, is suitable as a latent hardener. The reader is referred to the aforesaid document for further details. More-specific embodiments for a reactive melt adhesive of this kind are disclosed in WO 93/00381. These, too, are suitable in the context of the present invention.

Epoxy resin structural adhesives such as those further described, for example, in WO 00/37554 can also be used. These are, for example, compositions that contain a) a copolymer having at least a glass transition temperature of −30° C. or lower and groups reactive with respect to epoxides, or a reaction product of said copolymer with a polyepoxide, b) a reaction product of a polyurethane prepolymer and a polyphenol or aminophenol, and c) at least one epoxy resin. In order to make these compositions thermally hardenable, they additionally contain a latent hardener from the group of dicyandiamide, guanamines, guanidines, aminoguanidines, solid aromatic diamines, and/or hardening accelerators. They can additionally contain plasticizers, reactive diluents, rheology adjuvants, fillers, wetting agents and/or aging protection agents and/or stabilizers. The reader is referred to the aforesaid document for further details and concrete examples.

Thermally hardenable melt adhesives based on epoxy resin, having the following composition, can furthermore be used for the method according to the present invention (quantities indicated in parts by weight):

| Raw material | Quantity used (parts by weight) |
| --- | --- |
| Epoxy resin | 450 |
| Mineral fillers (silicates and carbonates) | 360 |
| Nitrile-polymer rubber | 100 |
| Hardener/accelerator (dicyandiamide, epoxy resin-amine adduct | 30 |
| Acrylate-based expandable hollow microspheres | 25 |

The thermally activatable adhesive systems recited above by way of example can be formulated with or without the blowing agents described earlier, depending on whether or not an increase in the volume of the adhesive upon resp. after thermal activation is desired.

It has further proven to be essential for the method according to the present invention if a thermally activatable adhesive containing
a) at least one reactive epoxy prepolymer,
b) at least one latent hardener for epoxies, and
c) one or more elastomers
is used.

The epoxy prepolymers, hereinafter referred to also as "epoxy resins," can in principle be saturated, unsaturated, cyclic or acyclic, aliphatic, alicyclic, aromatic, or heterocyclic polyepoxide compounds.

Suitable epoxy resins in the context of the present invention are, for example, preferably selected from epoxy resins of the bisphenol A type, epoxy resins of the bisphenol S type, epoxy resins of the bisphenol F type, epoxy resins of the phenol novolac type, epoxy resins of the cresol novolac type, epoxidized products of numerous dicyclopentadiene-modified phenol resins obtainable by the reaction of dicyclopentadiene with numerous phenols, epoxidized products of 2,2',6,6'-tetramethylbiphenol, aromatic epoxy resins such as epoxy resins having a naphthalene backbone and epoxy resins having a fluorene backbone, aliphatic epoxy resins such as neopentyl glycol diglycidyl ether and 1,6-hexanediol diglycidyl ether, alicyclic epoxy resins such as 3,4-epoxycyclohexylmethyl-3,4-epoxycyclohexane carboxylate and bis(3,4-epoxycyclohexyl) adipate, and epoxy resins having a hetero ring, such as triglycidyl isocyanurate.

The epoxy resins encompass in particular, for example, the reaction product of bisphenol A and epichlorohydrin, the reaction product of phenol and formaldehyde (novolac resins) and epichlorohydrin, glycidyl esters, and the reaction product of epichlorohydrin and p-aminophenol.

Further polyphenols that yield suitable epoxy resin prepolymers by reaction with epichlorohydrin (or epibromohydrin) are: resorcinol, 1,2-dihydroxybenzene, hydroquinone, bis(4-hydroxyphenyl)-1,1-isobutane, 4,4'-dihydroxybenzophenone, bis(4-hydroxyphenyl)-1,1-ethane, and 1,5-hydroxynaphthalene.

Further suitable epoxy prepolymers are polyglycidyl ethers of polyalcohols or diamines. Polyglycidyl ethers of this kind are derived from polyalcohols such as, for example, ethylene glycol, diethylene glycol, triethylene glycol, 1,2-propylene glycol, 1,4-butylene glycol, triethylene glycol, 1,5-pentanediol, 1,6-hexanediol, or trimethylolpropane.

Further preferred epoxy resins that are commercially obtainable encompass, in particular, octadecylene oxide, epichlorohydrin, styrene oxide, vinylcyclohexene oxide, glycidol, glycidyl methacrylate, diglycidyl ethers of bisphenol A (e.g. those that are obtainable under the commercial designations "Epon 828", "Epon 825", "Epon 1004" and "Epon 1010" of Hexion Specialty Chemicals Inc., "DER-331", "DER-332", "DER-334", "DER-732" and "DER-736" of Dow Chemical Co.), vinylcyclohexene dioxide, 3,4-epoxycyclohexylmethyl-3,4-epoxycyclohexene carboxylate, 3,4-epoxy-6-methylcyclohexylmethyl-3,4-epoxy-6-methylcyclohexene carboxylate, bis(3,4-epoxy-6-methylcyclohexylmethyl) adipate, bis(2,3-epoxycyclopentyl) ether, aliphatic epoxide modified with polypropylene glycol, dipentene dioxide, epoxidized polybutadiene (e.g. Krasol products of Sartomer), silicone resins containing epoxide functionality, flame-retardant epoxy resins (e.g. "DER-580", a brominated epoxy resin of the bisphenol type that is obtainable from Dow Chemical Co.), 1,4-butanediol diglycidyl ethers of a phenol/formaldehyde novolac (e.g. "DEN-431" and "DEN-438" of the Dow Chemical Co.), as well as resorcinol diglycidyl ethers (e.g. "Kopoxite" of the Koppers Company Inc.), bis(3,4-epoxycyclohexyl) adipate, 2-(3,4-epoxycyclohexyl-5,5-spiro-3,4-epoxy)cyclohexanemetadioxane, vinylcyclohexene monoxide, 1,2-epoxyhexadecane, alkyl glycidyl ethers such as, for example, C8 to C10 alkyl glycidyl ethers (e.g. "HELOXY Modifier 7" of Hexion Specialty Chemicals Inc.), C12 to C14 alkyl glycidyl ethers (e.g. "HELOXY Modifier 8" of Hexion Specialty Chemicals Inc.), butyl glycidyl ethers (e.g. "HELOXY Modifier 61" of Hexion Specialty Chemicals Inc.), cresyl glycidyl ethers (e.g. "HELOXY Modifier 62" of Hexion Specialty Chemicals Inc.), p-tert-butylphenyl glycidyl ethers (e.g. "HELOXY Modifier 65" of Hexion Specialty Chemicals Inc.), polyfunctional glycidyl ethers such as, for example, diglycidyl ethers of 1,4-butanediol (e.g. "HELOXY Modifier 67" of Hexion Specialty Chemicals Inc.), diglycidyl ethers of neopentyl glycol (e.g. "HELOXY Modifier 68" of Hexion Specialty Chemicals Inc.), diglycidyl ethers of cyclohexanedimethanol (e.g. "HELOXY Modifier 107" of Hexion Specialty Chemicals Inc.), trimethylolethane triglycidyl ethers (e.g. "HELOXY Modifier 44" of Hexion Specialty Chemicals Inc.), trimethylolpropane triglycidyl ethers (e.g. "HELOXY Modifier 48" of Hexion Specialty Chemicals Inc.), polyglycidyl ethers of an aliphatic polyol (e.g. "HELOXY Modifier 84" of Hexion Specialty Chemicals Inc.), polyglycol diepoxide (e.g. "HELOXY Modifier 32" of Hexion Specialty Chemicals Inc.), bisphenol F epoxies (e.g. "EPN-1138" or "GY-281" of Huntsman Int. LLC), 9,9-bis-4-(2,3-epoxypropoxy)phenylfluorenone (e.g. "Epon 1079" of Hexion Specialty Chemicals Inc.).

Further preferred commercially obtainable compounds are selected, for example, from Araldite™ 6010, Araldit™ GY-281™, Araldit™ ECN-1273, Araldit™ ECN-1280, Araldit™ MY-720, RD-2 of Huntsman Int. LLC; DEN™ 432, DEN™ 438, DEN™ 485 of Dow Chemical Co., Epon™ 812, 826, 830, 834, 836, 871, 872, 1001, 1031 etc. of Hexion Specialty Chemicals Inc. and HPT™ 1071, HPT™ 1079 likewise of Hexion Specialty Chemicals Inc., as novolac resins furthermore, for example, Epi-Rez™ 5132 of Hexion Specialty Chemicals Inc., ESCN-001 of Sumitomo Chemical, Quatrex 5010 of Dow Chemical Co., RE 305S of Nippon Kayaku, Epiclon™ N673 of DaiNipon Ink Chemistry, or Epicote™ 152 of Hexion Specialty Chemicals Inc.

In addition, the following polyepoxides can also be used at least in portions: polyglycidyl esters of polycarboxylic acids, for example reaction products of glycidol or epichlorohydrin with aliphatic or aromatic polycarboxylic acids such as oxalic acid, succinic acid, glutaric acid, terephthalic acid, or dimer fatty acid.

The epoxy equivalent of suitable polyepoxides can vary between 150 and 50,000, by preference between 170 and 5000. For example, an epoxy resin based on epichlorohydrin/bisphenol A that has an epoxy equivalent weight from 475 to 550 g/eq, resp. an epoxy group content in the range from 1820 to 2110 mmol/g, is suitable. The softening point determined in accordance with RPM 108-C is in the range from 75 to 85° C.

At least one epoxy resin that has reactive epoxy groups and is solid at 22° C. is preferably present as component a). It may be helpful, for the adjustment of flexibility, additionally to provide reactive epoxy resins that are liquid or pasty at 22° C.

Thermally activatable or latent hardeners for the epoxy resin binding agent system are used as hardeners. These can be selected from the following compounds: guanidines, substituted guanidines, substituted ureas, melamine resins, guanamine derivatives, cyclic tertiary amines, aromatic amines, and/or mixtures thereof. The hardeners can be incorporated stoichiometrically into the hardening reaction, but also can be catalytically active. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine, and very particularly cyanoguanidine (dicyandiamide). Representatives of suitable guanamine derivatives that may be recited are alkylated benzoguanamine resins, benzoguanamine resins, or methoxymethylethoxymethylbenzoguanamine. Dicyandiamide is preferably suitable.

In addition to or instead of the aforesaid hardeners, catalytically active substituted ureas can be used. These are, in particular, p-chlorophenyl-N,N-dimethylurea (monuron), 3-phenyl-1,1-dimethylurea (fenuron), or 3,4-dichlorophenyl-N,N-dimethylurea (diuron). In principle, catalytically active tertiary acrylamines or alkylamines such as, for example, benzyldimethylamine, tris(dimethylamino)phenol, piperidine, or piperidine derivatives can also be used. In addition, a variety of (by preference, solid) imidazole derivatives can be used as catalytically active accelerators. Representatives that may be named are 2-ethyl-2-methylimidazole, N-butylimidazole, benzimidazole, and N—$C_1$ to $C_{12}$ alkylimidazoles or N-arylimidazoles. Adducts of amino compounds with epoxy resins are also suitable as accelerating additives to the aforesaid hardeners. Suitable amino compounds are tertiary aliphatic, aromatic, or cyclic amines. Suitable epoxy compounds are, for example, polyepoxides based on glycidyl ethers of bisphenol A or F, or of resorcinol. Concrete examples of such adducts are adducts of tertiary amines such as 2-dimethylaminoethanol, N-substituted piperazines, N-substituted homopiperazines, N-substituted aminophenols, with di- or polyglycidyl ethers of bisphenol A or F or of resorcinol.

It has further proven to be essential according to the present invention if the adhesive used contains at least one elastomer c). This action makes it possible, for example, also to use the method according to the present invention for the adhesive bonding of large magnets that are exposed to extreme temperatures (utilization ranges above 120° C., in some cases even above 150° C.). Such conditions may be encountered, for example, in the sector of wind energy facilities, in particular in the offshore sector. This action further makes it possible to decrease the number of microcracks occurring in the region of the adhesive bond, for example those observed in a context of alternating temperature stress on the magnet.

The use of component c) according to the present invention also ensures more-uniform wetting of the surfaces to be bonded, with the result that air inclusions can be prevented. The risk of bondline corrosion can thereby be further reduced.

It has proven particularly preferable if component c) is selected from:
c1) thermoplastic polyurethanes,
c2) thermoplastic isocyanates,
c3) block copolymers having thermoplastic polymer blocks.

The elastomer component (c) can represent a thermoplastic polyurethane (c1) that can be reactive or nonreactive. In a preferred embodiment the thermoplastic polyurethane is nonreactive, in the sense that it is not further crosslinkable. The polyurethane in this context can be, in particular, one that contains a polyester chain.

The term "thermoplastic polyurethane" (often abbreviated "TPU") is known to one skilled in the art under discussion here. A TPU is an at least substantially linear polymer that is formed by a polymerization reaction of three initial components:
 1. a diisocyanate,
 2. a short-chain diol (often referred to as a "chain lengthener") of the general formula (OH—R—OH), where R denotes a hydrocarbon residue having 1 to 4 carbon atoms,
 3. a long-chain diol (OH—Z—OH), the group Z denoting a polymer chain that results in a so-called "soft segment" of the polyurethane that is obtained. The group Z can represent, for example, a polyether chain or polyester chain. Polyether chains can be formed by ring-opening polymerization of alkylene oxides such as, for example, ethylene oxide or propylene oxide, or by a corresponding reaction of saturated oxygen-containing heterocycles such as, for example, tetrahydrofuran. Polyester chains are created by reacting divalent alcohols with dibasic carboxylic acids. A preferred polyester chain is made of polycaprolactone polyester.

Reaction of these three components yields a polyurethane that contains alternating soft segments and hard segments. The soft segments are formed by the group Z, and the hard segments result from the diisocyanate and the short-chain diol.

The polarity of the hard segments results in a strong attraction among them, which in turn results in a high degree of aggregation and order in the solid phase of the polymer. This produces crystalline or pseudo-crystalline regions that are embedded in the soft and flexible matrix of the soft segments. The crystalline and pseudo-crystalline regions of the hard segments act as a physical link, imparting a high degree of elasticity to the TPU. The flexible chains of the soft segments contribute to the elongation behavior of the polymers.

The thermoplastic polyurethane c1) is preferably solid at room temperature (22° C.) and has a glass transition temperature below −20° C., by preference below −25° C. The thermoplastic polyurethane c1) that is by preference solid at room temperature furthermore has a melting range or softening range (per Kofler) that begins above 100° C., by preference above 115° C. Suitable polyurethanes c1) that are by preference solid at room temperature are further notable for the fact that they have, as a pure substance, an elongation at fracture of at least 300%, by preference at least 400%. Particularly suitable as thermoplastic polyurethanes c1) having these properties are those that contain a polycaprolactone polyester chain or a polyester chain.

The weight-average molar mass (Mw) of suitable polyurethanes c1), as determinable by gel permeation chromatography, is preferably in the range from 50,000 g/mol to 120,000 g/mol, in particular in the range from 55,000 g/mol to 90,000 g/mol.

Suitable thermoplastic polyurethanes that meet the preceding criteria are obtainable commercially and can be acquired on the basis of these specifications, for example, from the Merquinsa company in Spain or from Danquinsa GmbH in Germany.

Instead of or together with the reactive (crosslinkable) or nonreactive (non-crosslinkable) thermoplastic polyurethanes c1), the adhesive can contain thermoplastic isocyanates. These can be further crosslinked, and react e.g. with alcohol to yield thermoplastic polyurethanes that in turn can meet the criteria for component c1). These thermoplastic isocyanates can be, for example, isocyanate-terminated polyether polyols, in particular those that have a molar mass in the range between 1000 and 10,000 g/mol.

Instead of or together with the reactive (crosslinkable) or nonreactive (non-crosslinkable) thermoplastic polyurethanes c1) and/or the thermoplastic isocyanates c2), the adhesive can contain as a component c3) block copolymers having thermoplastic polymer blocks. These are by preference selected from those that contain a first polymer block having a glass transition temperature below 15° C., in particular below 0° C., and a second polymer block having a glass transition temperature above 25° C., in particular above 50° C. Also suitable are those block copolymers that are selected from those in which a first polymer block is selected from a polybutadiene or polyisoprene block, and a second polymer block is selected from a polystyrene or polymethyl methacrylate block.

Block copolymer c3) is selected, for example, from copolymers having the following block configuration: styrene-butadiene-(meth)acrylate, styrene-butadiene-(meth)acrylic acid ester, ethylene-(meth)acrylic acid ester-glycidyl (meth)acrylic acid ester, ethylene-(meth)acrylic acid ester-maleic acid anhydride, (meth)acrylic acid ester-butyl acrylate-(meth)acrylic acid ester, by preference methyl methacrylate-butyl acrylate-methyl methacrylate.

The composition of these block copolymers is defined above by indicating the monomer unit for each block. This is to be understood to mean that each block copolymer contains polymer blocks made of the recited monomers. In the context of the individual polymer blocks, up to 20 mol % of the recited monomers can be replaced by other co-monomers. This applies in particular to blocks of polymethyl methacrylate.

The block copolymers recited above correspond to those that can also be used in the context of WO 2007/025007. More detailed information thereon, and further block copolymers also suitable in the context of the present invention, may be gathered from page 25, line 21 to page 26, line 9 of that document. Also to be found therein are cross-references to documents in which the manufacture of such block copolymers is described.

In addition to the components described above, the adhesive according to the present invention can contain as a further component
d) rubber particles,
preferably those that have a core-shell structure.

The use of component d) in the context of the method according to the present invention makes it possible to reduce further the risk of microcracks occurring.

It is preferred in this context that the rubber particles having a core-shell structure comprise a core made of polymer material having a glass transition temperature below 0° C. and a casing made of a polymer material having a glass transition temperature above 25° C. Particularly suitable rubber particles having a core-shell structure can comprise a core made of a diene homopolymer, a diene copolymer, or a polysiloxane elastomer, and/or a shell made of an alkyl(meth)acrylate homopolymer or copolymer.

The core of these core-shell particles can, for example, contain a diene homopolymer or copolymer, which can be selected from a homopolymer of butadiene or isoprene, a copolymer of butadiene or isoprene with one or more ethylenically unsaturated monomers, for example vinyl aromatic monomers, (meth)acrylonitrile, (meth)acrylates, or similar monomers. The polymer or copolymer of the shell can contain as monomers, for example: (meth)acrylates such as in particular methyl methacrylate, vinyl aromatic monomers (e.g. styrene), vinyl cyanides (e.g. acrylonitrile), unsaturated acids or anhydrides (e.g. acrylic acid), (meth)acrylamides, and similar monomers that result in polymers having a suitably high glass temperature.

Other rubber-like polymers, for example poly(butyl acrylate), or polysiloxane elastomers, for example polydimethylsiloxane, in particular crosslinked polydimethylsiloxane, can be used as a core.

These core-shell particles are typically constructed so that the core accounts for 50 to 95 wt % of the core-shell particle, and the shell for 5 to 50 wt % of said particle.

By preference, these rubber particles are relatively small. For example, the average particle size (as determinable, for example, using light scattering methods) can be in the range from approximately 0.03 to approximately 2 µm, in particular in the range from approximately 0.05 to approximately 1 µm. Smaller core-shell particles can, however, also be used, for example those whose average diameter is less than approximately 500 nm, in particular less than approximately 200 nm. For example, the average particle size can be in the range from approximately 25 to approximately 200 nm.

The manufacture of such core-shell particles is known in the existing art, as indicated for example on page 6, lines 16 to 21 of WO 2007/025007. Commercial procurement sources for core-shell particles of this kind are listed in this document in the last paragraph of page 6 to the first paragraph of page 7. Reference to said procurement sources is hereby made. Reference is further made to manufacturing methods for such particles that are described in the aforesaid document from page 7, second paragraph to page 8, first paragraph. For more detailed information about suitable core-shell particles, reference is likewise made to the aforesaid document WO 2007/025007, which contains extensive information thereon from page 8, line 15 to page 13, line 15.

Inorganic particles that comprise a casing made of organic polymers can take on the same function as the rubber particles recited above having a core-shell structure. A further preferred embodiment of the present invention is therefore characterized in that the compound according to the present invention contains, as an additional component,
e) inorganic particles
that comprise a casing made of organic polymers.

In this embodiment the adhesive contains inorganic particles that comprise a casing made of organic polymers, the organic polymers preferably being selected from homo- or copolymers of acrylic acid esters and/or methacrylic acid esters, and being made up of at least 30 wt % polymerized-in esters of acrylic acid and/or methacrylic acid.

The inorganic particles by preference have, before application of the casing made of organic polymers, an average particle size in the range from 1 to 1000 nm, in particular in the range from 5 to 30 nm. It is known that the particle size can be determined by light scattering methods and by electron microscopy.

The casing made of organic polymers has a lower density than the inorganic particles themselves. The casing made of organic polymers preferably has a thickness such that the weight ratio of the inorganic core to the casing made of organic polymers is in the range from 2:1 to 1:5, by preference in the range from 3:2 to 1:3. This can be controlled by selecting the reaction conditions during growth of the casing made of organic polymers onto the inorganic particles.

In general, the inorganic particles can be selected from metals, oxides, hydroxides, carbonates, sulfates, and phosphates. Mixed forms made up of oxides, hydroxides, and carbonates, for example basic carbonates or basic oxides, can also be present. If inorganic particles made of metals are selected, then iron, cobalt, nickel, or alloys that are made up of at least 50 wt % of one of said metals, are preferably suitable. Oxides, hydroxides, or mixed forms thereof are preferably selected from those of silicon, cerium, cobalt, chromium, nickel, zinc, titanium, iron, yttrium, zirconium, and/or aluminum. Mixed forms of these are also possible, for example particles made of aluminosilicates or silicate glasses. Zinc oxide, aluminum oxides or hydroxides, and $SiO_2$ resp. the oxide forms of silicon referred to as "silicic acid" or "silica," are particularly preferred. The inorganic particles can furthermore be made up of carbonates, for example calcium carbonate, or of sulfates, for example barium sulfate. It is of course also possible for particles having inorganic cores of different compositions to be present alongside one another.

In order to manufacture the inorganic particles that comprise a casing made of organic polymers, it is possible to proceed, for example, as described in WO 2004/111136 A1 using the example of coating zinc oxide with alkylene ethercarboxylic acids. According to this procedure, the untreated inorganic particles are suspended in a nonpolar or weakly polar solvent, monomeric or prepolymeric constituents of the casing are then added, the solvent is removed, and polymerization is started, for example radically or photochemically. It is further possible to proceed by analogy with the manufacturing method described in EP 1 469 020 A1, monomers or prepolymers of the casing material being used as organic coating components for the particles.

Manufacturing methods such as those as described in WO 2006/053640 can also be resorted to. For the present invention, the inorganic cores to be selected in this context are those described, with their manufacturing methods, on page 5, line 24 to page 7, line 15 of WO 2006/053640. The coating of these cores is accomplished in a manner analogous to that described on page 10, line 22 to page 15, line 7 of that document. The adhesive can contain either only the aforesaid rubber particles, or only the aforesaid encased inorganic particles, or both types of particle simultaneously.

As referred to earlier, it is preferred, in particular in that embodiment in which the adhesive-coated magnets are inserted into slots in the rotor or stator, that the adhesive additionally contain
f) at least one blowing agent.

Examples of suitable blowing agents, and of their preferred quantitative ranges, have already been recited above.

Thermal conduction in the adhesive, and thus its curing behavior, can be improved by adding particles that readily conduct heat, for example metal powder (which includes powder made of metal alloys). An embodiment of the adhesive therefore consists in the fact that it additionally contains
g) metal powder.
Suitable metal powders can be selected from powders of iron (in particular steel), aluminum, zinc, copper, or alloys that contain at least 50 wt % of one of these elements. It is preferable to use metal powder in which 90 wt % of the particles have a particle size, determinable by sieve analysis, in the range between 10 and 100 µm.

As a rule, the adhesives usable according to the present invention further contain fillers known per se, for example the various milled or precipitated chalks, carbon black, calcium magnesium carbonates, talc, barite, silicic acids or silica, and in particular silicate fillers of the aluminum magnesium calcium silicate type, for example wollastonite, chlorite.

For weight reduction, the adhesive can also contain, in addition to the aforesaid "normal" fillers, so-called lightweight fillers. These can be selected from the group of the hollow metal spheres such as, for example, hollow steel spheres, hollow glass spheres, fly ash (fillite), hollow plastic spheres based on phenol resins, epoxy resins or polyesters, expanded hollow microspheres having a wall material made of (meth)acrylic acid ester copolymers, polystyrene, styrene/(meth)acrylate copolymers, and in particular of polyvinylidene chloride as well as copolymers of vinylidene chloride with acrylonitrile and/or (meth)acrylic acid esters, hollow ceramic spheres, or organic lightweight fillers of natural origin such as ground nut shells, for example the shells of cashew nuts, coconuts, or peanuts, as well as cork flour or coke powder. Particularly preferred in this context are those lightweight fillers, based on hollow microspheres, that ensure high compressive strength in the cured adhesive.

In one possible embodiment, the adhesive additionally contains fibers, for example based on aramid fibers, carbon fibers, metal fibers (made, for example, of aluminum), glass fibers, polyamide fibers, polyethylene fibers, or polyester fibers, these fibers by preference being pulp fibers or staple fibers that have a fiber length between 0.5 and 6 mm and a diameter from 5 to 20 µm. Polyamide fibers of the aramid fiber type, or also polyester fibers, are particularly preferred in this context.

The hardenable substances according to the present invention can further contain common additional adjuvants and additives such as, for example, plasticizers, rheology adjuvants, wetting agents, adhesion promoters, aging protection agents, stabilizers, and/or color pigments.

The adhesive preferably contains the individual components in the quantitative ranges indicated below. The quantitative indications are to be understood as a percentage by weight based on the complete adhesive, and the quantities are to be selected so as to yield a total of 100 wt %:

a) Reactive epoxy prepolymer: at least 20, by preference at least 30 wt %, and up to 80, by preference up to 70, and in particular up to 60 wt %. In this context, either the entire proportion of epoxy prepolymer is solid at 22° C., or a mixture of reactive epoxy prepolymers is used, a portion of the epoxy prepolymer being solid at 22° C. and another portion of the epoxy prepolymers being liquid or pasty at 22° C. ("Pasty" means that the substance can be spread out into a film.) By way of the mixing ratio of epoxy prepolymers that are solid and liquid at 22° C., it is possible to adjust whether or not the adhesive is tacky at 22° C.: the smaller the quantity of liquid epoxy prepolymer used, the lower the tack. For example, the quantitative ratio between epoxy prepolymers solid at 22° C. and liquid or pasty at 22° C. can be in the range from 10:1 to 1:10.

b) Latent hardener for epoxies: at least 1, by preference at least 2 wt %, and up to 10, by preference up to 8 wt %. A hardening accelerator can additionally be provided. If desired, the latter can be present in a quantity in the range from at least 0.1, by preference at least 0.5 wt %, and up to 6 wt %, by preference up to 5 and in particular up to 3 wt %.

c) One or more elastomers selected from: c1) thermoplastic polyurethanes, c2) thermoplastic isocyanates, c3) block copolymers having thermoplastic polymer blocks: in total at least 1, by preference at least 5, and in particular at least 10 wt %, and up to 70, by preference up to 50 wt %. Only one of components c1) to c3), or two of said components, or all three components, can be present. Particularly preferably, at least one of components c1) and c2), particularly preferably component c1), is present. Together with the latter, component c3) is by preference additionally used. In this case component c1) and/or c2) is present in total at a proportion of at least 1, by preference at least 5 wt %, and up to 35, by preference up to 25 wt %, and component c3) at a proportion of at least 1 wt % and up to 35 wt %, by preference up to 25 wt %. In addition to these elastomers, the adhesive can contain further polymers and copolymers having elastomer properties, or rubber particles d) preferably having a core-shell structure, for example copolymers of dienes (such as butadiene, isoprene) and (meth)acrylic acid or esters thereof. These can be present in quantitative proportions (based on the total adhesive) of up to 20 wt % and in particular up to 10 wt %, and by preference of more than 1 wt %, in particular more than 4 wt %.

e) Inorganic particles that comprise a shell made of organic polymers: not obligatorily necessary. If present: by preference a total of at least 5, by preference at least 10 wt %, and up to 45, by preference up to 35, and in particular up to 25 wt %. Quantities between 0 and 5 wt % are likewise possible.

f) Blowing agent: not necessary if the adhesive is not intended to be thermally expandable. If a thermally expandable adhesive is desired, the proportion of blowing agent required depends on the desired expansion factor, and can be ascertained empirically. A blowing agent content in the range from 0.2 to 1.5 wt % can serve as a starting point. Blowing agent contents of up to 5 and up to 10 wt % are, however, also possible.

g) Metal powder: not obligatorily necessary. If present: by preference at least 0.1, in particular at least 5 wt %, and up to 40, by preference up to 25 wt %.

Further adjuvants such as fillers and color pigments: zero to a total of 60, by preference up to a total of 40 wt %, in particular up to a total of 20 wt %, and by preference at least 5, in particular at least 10 wt %.

The adhesive described above can be configured, depending on the intended use, so that it is either tacky or not at room temperature (22° C.). If an adhesive that is tacky at 15 to 50° C. is desired, this can as a rule be achieved by way of the ratio of liquid to solid polymer components. By way of the mixing ratio of epoxy prepolymers that are solid and liquid at 22° C., it is possible to adjust whether or not the adhesive is tacky: the smaller the quantity of liquid epoxy prepolymer that is used, the lower the tack. The quantitative ratio of epoxy prepolymers that are solid at 22° C. and liquid or pasty at 22° C. can be, for example, in the range from 10:1 to 1:10.

Alternatively or additionally, tackifying resins such as, for example, aromatic, aliphatic, or cycloaliphatic hydrocarbon resins, as well as modified or hydrogenated natural resins, can be added to the adhesive. Suitable resins are, for example, terpene resins such as terpolymers or copolymers of terpene, modified natural resins such as resin acids from balsam resin, tall resin, or wood rosin, optionally also hydroabietyl alcohol and esters thereof, acrylic acid copolymerizates such as styrene-acrylic acid copolymers or copolymerizates of ethylene, acrylate esters, and maleic acid anhydride, or resins based on functional hydrocarbon resins. Also suitable as a usable tackifying resin are low-molecular-weight reaction products that are made up of ethylene/propylene-alpha-olefin polymers. The molecular weight of such polymers is usually equal to less than 2000 g/mol.

In a further aspect, the present invention encompasses ready-to-assemble pre-coated magnets that are pre-coated with the special adhesive in order to be bonded on resp. in according to the method in accordance with the present invention. The statements made above apply correspondingly to the preferred compositions of the adhesive.

EXAMPLES

Raw materials 1 to 7 in accordance with the table below were mixed with one another in a planetary mixer at a temperature of 120° C. The subsequent process steps occur at a temperature of at most 60° C.

Quantities Indicated in Wt %

|  |  | Example 1 | Example 2 | Example 3 |
|---|---|---|---|---|
| 1 | Epoxy resin solid at 22° C. (Epon ™ 1001) | 28.80 | 28.90 | 28.8 |
| 2 | Epoxy resin liquid at 22° C. | 21.6 | 21.7 | — |
| 3a | Butadiene-acrylic copolymer | 7.2 | 7.2 | — |
| 3b | Thermoplastic polyurethane (Pearlcoat ™ 125K) | 14.40 | 14.40 | 14.4 |
| 4 | Rubber particles (Keneka Ace ™ MX-125) | — | — | 28.8 |
| 5 | $CaCO_3$ | 10.50 | 10.60 | 10.6 |
| 6 | Aluminum powder | 9.60 | 0.00 | 9.5 |
| 7 | Coated aluminum powder | 0.00 | 9.60 | — |
| 8 | Dicyandiamide | 4.00 | 4.00 | 4.0 |
| 9 | Accelerator (Ajicure ™ AH30) | 1.90 | 1.90 | 1.9 |
| 10 | Expandable hollow microspheres | 0.80 | 0.50 | 0.8 |
| 11 | Pyrogenic silicic acid | 1.00 | 1.00 | 1.0 |
| 12 | Color pigment (carbon black) | 0.20 | 0.20 | 0.2 |

This mixture can be extruded or laminated onto the magnets, or the magnets are overmolded with the adhesive.

Foaming Behavior

|  | Example 1 | Example 2 | Example 3 |
|---|---|---|---|
| Hardening conditions: | | 150° C.-37 minutes | |
| Density [g/cm³] (before hardening) | 1.26 | 1.25 | 1.26 |
| Expansion rate [%] (open space) | 60% | 40% | 60.5% |
| Density after hardening [g/cm³] | 0.79 | 0.89 | 0.79 |

Test Results

Lap shear strength (LSS)-
10 mm overlap-
Testing rate: 20 mm/min

|  |  | Example 1 | Example 2 | Example 3 |
|---|---|---|---|---|
| I. | Curing: | | 180° C.-10 minutes | |
| | Substrate: | | Cold-rolled steel (CRS) DC 05 (1.5 mm) | |
| | LSS (MPa) | 22.6 | 26.0 | 22.6 |
| | Substrate: | | Aluminum AC170 (0.8 mm) | |
| | LSS (MPa) | 17.1 | 18.9 | 17.1 |
| II. | Curing: | | 150° C.-5 minutes | |
| | Substrate: | | CRS DC 05 (1.5 mm) | |
| | LSS (MPa) | 8.2 | 9.9 | — |

Bonded area=25*10 mm, adhesive layer thickness=0.2 mm

In all instances, 100% cohesive fracture was observed.

What is claimed is:

1. A method for adhesively bonding a magnet onto the surface or into a slot of a rotor or stator of an electric motor or of a generator, in which
   i) the surface or surfaces of the magnet that is or are to be bonded are pre-coated with an adhesive that is not liquid at 22° C. and that does not cure without an activation step;
   ii) optionally, the magnet coated with the adhesive is temporarily stored and/or is transported from the coating location to the bonding location,
   iii) the magnet having the surface coated with the adhesive is placed onto the surface of the rotor or stator and immobilized, or the magnet is inserted into a slot of the rotor or stator in such a way that at least one adhesive-coated surface is located opposite an inner wall of the slot, and
   iv) the adhesive is activated, by heating or by high-energy radiation, so that it cures,
   wherein an adhesive containing
   a) at least one reactive epoxy prepolymer,
   b) at least one latent hardener for epoxies, and
   c) one or more elastomers selected from A) block copolymers that contain a first polymer block having a glass transition temperature below 15° C. and a second polymer block having a glass transition temperature above 25° C., B) a block copolymer and a thermoplastic polyurethane or A and B is used.

2. A method for adhesively bonding a magnet onto the surface or into a slot of a rotor or stator of an electric motor or of a generator, in which
   i) the surface or surfaces of the rotor or stator that is or are to be bonded are pre-coated with an adhesive that is not liquid at 22° C. and that does not cure without an activation step;
   ii) optionally, the rotor or stator coated with the adhesive is temporarily stored and/or is transported from the coating location to the bonding location,
   iii) the magnet is brought into contact with the adhesive-coated surface of the rotor or stator, and
   iv) the adhesive is activated, by heating or by high-energy radiation, so that it cures,
   wherein an adhesive containing
   a) at least one reactive epoxy prepolymer,
   b) at least one latent hardener for epoxies, and
   c) one or more elastomers selected from A) block copolymers that contain a first polymer block having a glass transition temperature below 15° C. and a second polymer block having a glass transition temperature above 25° C., B) a block copolymer and a thermoplastic polyurethane or A and B is used.

3. The method according to claim 1, wherein the adhesive is applied onto the magnet or onto the rotor or stator at a layer thickness in the range from 0.1 to 5 mm.

4. The method according to claim 1, wherein the magnet is adhesively bonded onto the surface of the rotor or stator; and an adhesive that is tacky at a temperature in the range from 15 to 50° C. is used for pre-coating, so that the magnet adheres to the surface of the rotor or stator before the adhesive is activated for curing.

5. The method according to claim 1, wherein the magnet is adhesively bonded into a slot of the rotor or stator; and an adhesive that is not tacky at a temperature in the range from 15 to 50° C. is used for pre-coating.

6. The method according to claim 1, wherein an adhesive that increases in volume by at least 1% after the activation step is used.

7. The method according to claim 1, wherein an adhesive activatable by heating to a temperature in the range from 60 to 200° C. is used, and after step iii) the adhesive is heated to a temperature in the range from 60 to 200° C. so that it cures.

8. The method according to claim 1, wherein an epoxy resin that is solid at 22° C., having reactive epoxy groups, is present at least in part as component a).

9. The method according to claim 6, wherein the adhesive additionally contains at least one blowing agent.

10. The method of claim 1 wherein elastomer c) block copolymer is methyl methacrylate-butyl acrylate-methyl methacrylate.

11. The method of claim 1 wherein elastomer c) block copolymer has the following block configuration: styrene-butadiene-(meth)acrylate, styrene-butadiene-(meth)acrylic acid ester, ethylene-(meth)acrylic acid ester-glycidyl(meth)acrylic acid ester, ethylene-(meth)acrylic acid ester-maleic acid anhydride, (meth)acrylic acid ester-butyl acrylate-(meth)acrylic acid ester, methyl methacrylate-butyl acrylate-methyl methacrylate.

\* \* \* \* \*